US011951339B2

(12) United States Patent
Strauss et al.

(10) Patent No.: US 11,951,339 B2
(45) Date of Patent: Apr. 9, 2024

(54) FALL PROTECTION SYSTEM

(71) Applicant: 3M INNOVATIVE PROPERTIES COMPANY, St. Paul, MN (US)

(72) Inventors: Andrew C. Strauss, Goodhue, MN (US); Nicholas G. Bauer, Lake City, MN (US); Michael T. Weiss, Hastings, MN (US)

( * ) Notice: Subject to any disclaimer, the term of this patent is extended or adjusted under 35 U.S.C. 154(b) by 143 days.

(21) Appl. No.: 17/754,959

(22) PCT Filed: Nov. 6, 2020

(86) PCT No.: PCT/IB2020/060469
§ 371 (c)(1),
(2) Date: Apr. 18, 2022

(87) PCT Pub. No.: WO2021/099876
PCT Pub. Date: May 27, 2021

(65) Prior Publication Data

US 2022/0379148 A1 Dec. 1, 2022

Related U.S. Application Data

(60) Provisional application No. 62/938,540, filed on Nov. 21, 2019.

(51) Int. Cl.
*B66C 23/44* (2006.01)
*A62B 35/00* (2006.01)
*E04G 21/32* (2006.01)

(52) U.S. Cl.
CPC ...... *A62B 35/0068* (2013.01); *E04G 21/3238* (2013.01)

(58) Field of Classification Search
CPC ........................ A62B 35/0068; E04G 21/3238
See application file for complete search history.

(56) References Cited

U.S. PATENT DOCUMENTS 2,107,500 A * 2/1938 Price .................... B66C 23/202 212/223
4,015,686 A 4/1977 Bushnell, Jr.
(Continued)

FOREIGN PATENT DOCUMENTS

CA 2644824 A1 5/2010
CN 207313800 U 5/2018
(Continued)

OTHER PUBLICATIONS

International Search Report for PCT Application No. PCT/IB2020/060467 dated Feb. 2, 2021, 3 pages.
(Continued)

*Primary Examiner* — Amy J. Sterling
(74) *Attorney, Agent, or Firm* — Colene H. Blank; Johannes P. M. Kusters

(57) ABSTRACT

A fall protection system includes a base assembly, a mast assembly, and a locking assembly adapted to lock the mast assembly with the base assembly. The locking assembly includes a first plate and a second plate. The locking assembly also includes a fixed member fixedly coupled to the second plate. The locking assembly further includes a locking pin including an elongate portion at least partially received within the fixed member and a first tab, the locking pin being movable relative to the fixed member between an engaged position and a disengaged position. In the engaged position, the first tab is at least partially received within a first groove such that the locking pin is engaged with the first plate. Further, in the disengaged position, the first tab is at least partially received within a second groove such that the locking pin is spaced apart from the first plate.

20 Claims, 8 Drawing Sheets

(56) References Cited

U.S. PATENT DOCUMENTS

| | | | | |
|---|---|---|---|---|
| 4,096,952 | A * | 6/1978 | Diggs | B66C 23/201 212/176 |
| 4,619,346 | A | 10/1986 | Deguerry | |
| 6,082,561 | A | 7/2000 | Bembas | |
| 7,032,710 | B2 | 4/2006 | Anderson et al. | |
| 7,070,059 | B1 * | 7/2006 | Flowers | B66C 23/44 414/921 |
| 9,617,125 | B2 * | 4/2017 | Gomani | B66C 23/26 |
| 2010/0126801 | A1 | 5/2010 | Begin et al. | |
| 2015/0375020 | A1 | 12/2015 | Palet | |
| 2017/0370114 | A1 | 12/2017 | Kornijenko et al. | |
| 2018/0126198 | A1 | 5/2018 | Troy et al. | |

FOREIGN PATENT DOCUMENTS

| | | | |
|---|---|---|---|
| EP | 0517997 | B1 | 12/1994 |
| EP | 2999523 | B1 | 4/2017 |
| FR | 2968325 | B1 | 8/2013 |
| WO | 2014189512 | A1 | 11/2014 |
| WO | 2021099874 | A1 | 5/2021 |
| WO | 2021099875 | A1 | 5/2021 |

OTHER PUBLICATIONS

International Search Report for PCT Application No. PCT/IB2020/060468 dated Feb. 2, 2021, 3 pages.

International Search Report for PCT Application No. PCT/IB2020/060469 dated Feb. 16, 2021, 3 pages.

* cited by examiner

FALL PROTECTION SYSTEM

TECHNICAL FIELD

The present disclosure relates to a fall protection system.

BACKGROUND

As per regulations applied on construction, industrial, maintenance, and allied industries, it is essential to employ a system that protects personnel from falling when personnel perform operations at elevated locations. In order to comply with such regulations, industries take various measures to ensure protection of personnel operating at the worksites. Typically, a fall protection system is used at the worksite when personnel perform work operations at the elevated locations. The fall protection system is transportable from one place to another by a conveying apparatus, such as a forklift, as per requirements. Further, the fall protection system typically includes a base assembly, a mast assembly, and a jib portion. A personnel is tethered to the jib portion using one or more cables in order to ensure fall protection. It is desirable that the fall protection system is lightweight, easy to install and transport, and provides improved reliability in operation.

SUMMARY

Generally, the present disclosure relates to a fall protection system and a method of locking a mast assembly with a base assembly of the fall protection system.

Some embodiments of the present disclosure relate to a fall protection system. The fall protection system includes a base assembly. The fall protection system also includes a mast assembly rotatable about a first axis defined by the mast assembly. The fall protection system further includes a locking assembly adapted to lock the mast assembly with the base assembly. The locking assembly includes a first plate fixedly coupled to the base assembly. The locking assembly includes a second plate fixedly coupled to the mast assembly. The locking assembly also includes a fixed member fixedly coupled to the second plate. The fixed member defines a first groove and a second groove. The locking assembly further includes a locking pin including an elongate portion at least partially received within the fixed member and a first tab extending from the elongate portion. The locking pin is movable relative to the fixed member between an engaged position and a disengaged position. In the engaged position, the first tab is at least partially received within the first groove such that the locking pin is engaged with the first plate to restrict a movement of the mast assembly relative to the base assembly. Further, in the disengaged position, the first tab is at least partially received within the second groove such that the locking pin is spaced apart from the first plate.

In some embodiments, the fixed member defines a longitudinal axis along its length. The locking pin is movable along the longitudinal axis and rotatable about the longitudinal axis relative to the fixed member.

In some embodiments, the first tab extends substantially perpendicular to the longitudinal axis.

In some embodiments, the first groove is spaced apart from the second groove with respect to the longitudinal axis.

In some embodiments, the locking pin further includes a handling portion extending substantially perpendicular to the longitudinal axis.

In some embodiments, the fixed member further includes a third groove extending from and communicating with the first groove and the second groove. The locking pin is rotatable from the disengaged position such that the first tab is at least partially received within the third groove.

In some embodiments, the fixed member has a substantially hollow tubular shape.

In some embodiments, the first plate includes a plurality of through-holes. In the engaged position, the elongate portion is received through a corresponding through-hole of the plurality of through-holes.

In some embodiments, the first plate defines a plurality of slots, such that each through-hole of the plurality of through-holes is in communication with a corresponding slot.

In some embodiments, the locking pin further includes at least one second tab spaced apart from the first tab. In the engaged position of the locking pin, the at least one second tab is misaligned with the slot in communication with the corresponding through-hole that receives the elongate portion of the locking pin therethrough.

In some embodiments, the first plate defines a plurality of pairs of cut-outs, such that a pair of bracket members are removably coupled with two corresponding pairs of cut-outs of the plurality of pairs of cut-outs for restricting an angular movement of the mast assembly relative to the base assembly.

Some embodiments of the present disclosure relate to a fall protection system. The fall protection system includes a base assembly. The fall protection system also includes a mast assembly rotatable about a first axis defined by the mast assembly. The fall protection system further includes a locking assembly adapted to lock the mast assembly with the base assembly. The locking assembly includes a first plate fixedly coupled to the base assembly. The first plate defines a plurality of through-holes and a plurality of slots, such that each through-hole of the plurality of through-holes is in communication with a corresponding slot. The locking assembly also includes a second plate fixedly coupled to the mast assembly. The locking assembly further includes a fixed member fixedly coupled to the second plate. The fixed member defines a first groove and a second groove. The locking assembly includes a locking pin including an elongate portion at least partially received within the fixed member, a first tab extending from the elongate portion, and at least one second tab spaced apart from the first tab. The locking pin is movable relative to the fixed member between an engaged position and a disengaged position. In the engaged position, the first tab is at least partially received within the first groove, the elongate portion of the locking pin is received through a corresponding through-hole of the plurality of through-holes such that the locking pin is engaged with the first plate, and the at least one second tab is misaligned with the slot in communication with the corresponding through-hole that receives the elongate portion of the locking pin therethrough. Further, in the disengaged position, the first tab is at least partially received within the second groove such that the locking pin is spaced apart from the first plate.

Some embodiments of the present disclosure relate to a method of locking a mast assembly with a base assembly of a fall protection system. The method includes moving a locking pin from a disengaged position such that the locking pin is movable relative to a fixed member that is fixedly coupled to a second plate. The second plate is fixedly coupled to the mast assembly. The method also includes receiving the locking pin through a through-hole defined in a first plate. The first plate is fixedly coupled to the base assembly. The method further includes rotating the locking pin to an engaged position to at least partially receive a first tab of the locking pin within a first groove defined in the fixed member.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a fall protection system having a base assembly, a height adjustable mast assembly, a jib connected to a portion of the mast assembly, and a counterweight. The height adjustable mast assembly includes a fixed mast section and a movable mast section that may be moved relative to the fixed mast section. As per requirements, the movable mast section may be locked with the fixed mast section. Further, the mast assembly can be locked with the base assembly. The fall protection system may be used to arrest or prevent falling of a personnel operating at any worksite or industry.

The term "aligned" as used herein refers to angular alignment between a first component and a second component. In case the first component is a projection or a tab, and the second component defines a complementary opening, groove, or slot, the first component can be at least partially received within the second component when the first and second components are aligned with each other. In cases the first and second components are misaligned with each other, the first component cannot be received in the second component. In some cases, the first and second components can be axially spaced apart from each other when they are aligned.

Figure 1:
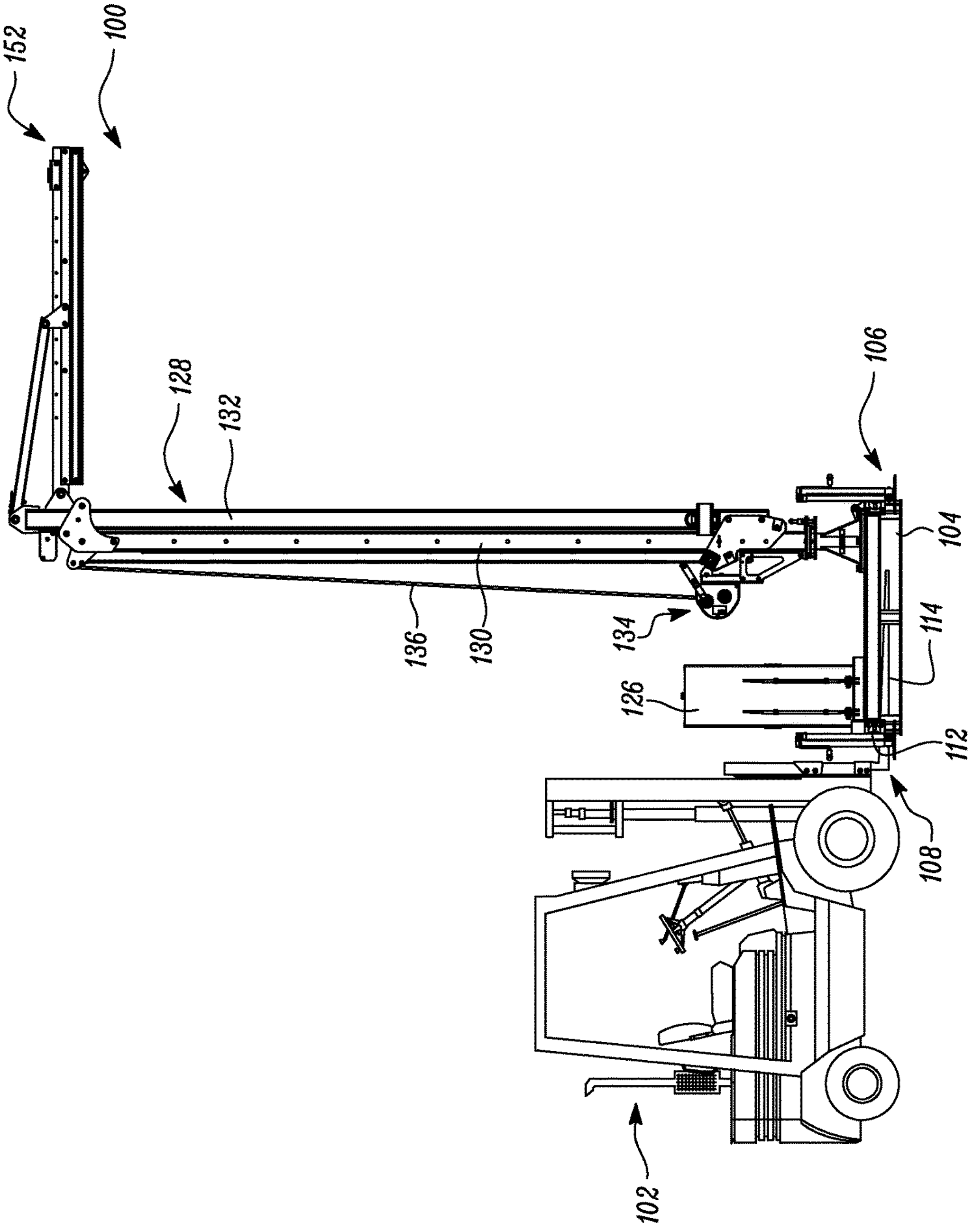
FIG. 1 is a side view of a fall protection system received by a conveying apparatus for transportation according to an embodiment of the present disclosure.

FIG. 1 illustrates an exemplary fall protection system 100. The fall protection system 100 may be used in industries, such as, construction, industrial, maintenance, and the like. The fall protection system 100 is transportable from one location to another as per application requirements. For this purpose, the fall protection system 100 is receivable by a conveying apparatus 102. The conveying apparatus 102 may include a forklift, a hand truck, or any other conveying apparatus that may be used to facilitate transportation of the fall protection system 100 from one location to another.

The fall protection system 100 includes a base plate 104 defining a first side 106 and a second side 108 defined opposite to the first side 106. Further, a first surface 110 (shown in FIG. 2) is defined at the first side 106 and a second surface 112 is defined at the second side 108. The base plate 104 is generally rectangular in shape. Alternatively, the base plate 104 may be square in shape. Further, the base plate 104 of the fall protection system 100 is receivable by the conveying apparatus 102. In an example, the base plate 104 may include one or more ports (not shown) to receive arms 114 of the conveying apparatus 102.

Figure 2:
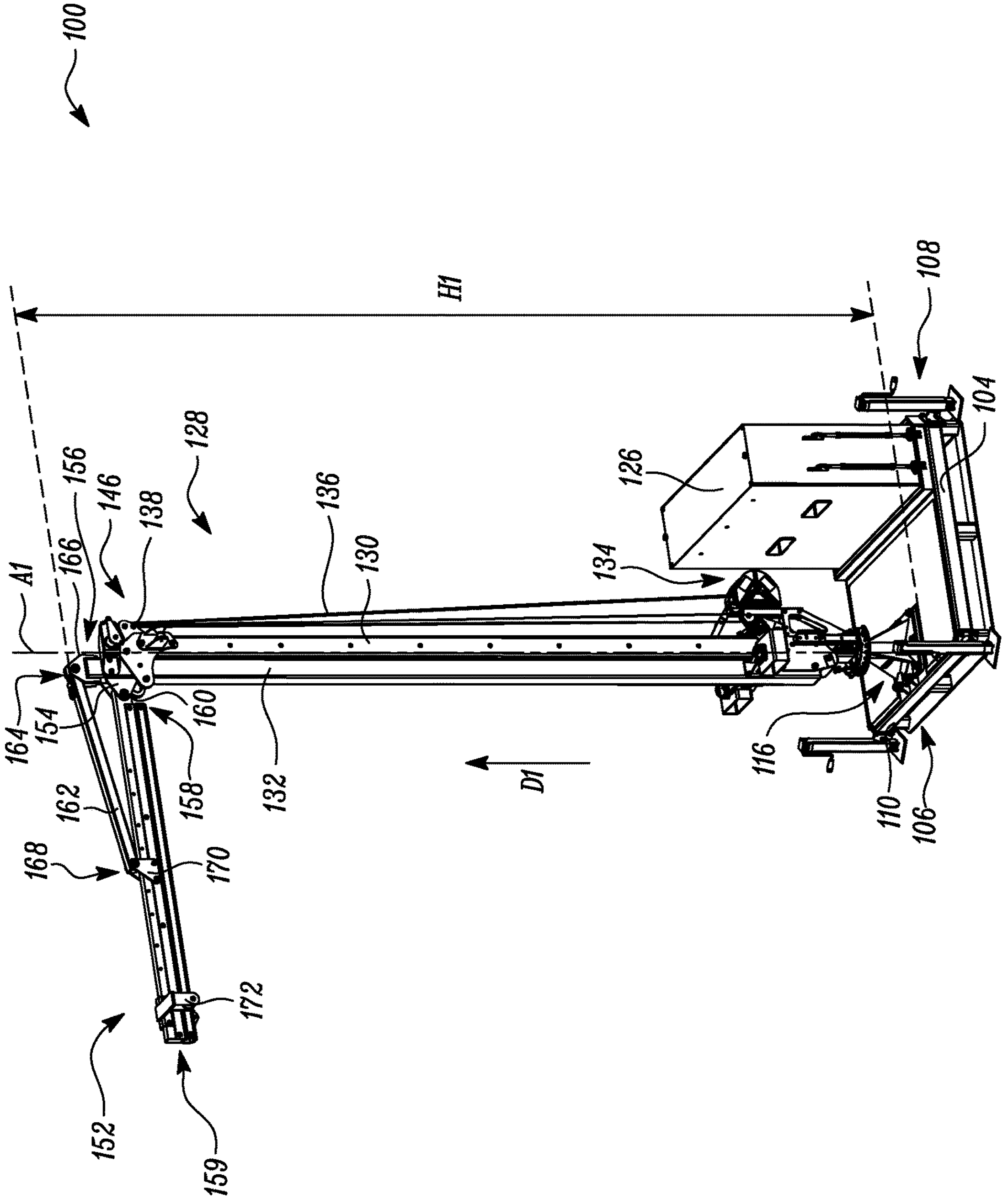
FIG. 2 is a perspective view of the fall protection system shown in FIG. 1.

As shown in FIG. 2, a base assembly 116 is connected to the base plate 104. It should be noted that the base assembly 116 is pivotably connected to base plate 10, such that the base assembly, a mast assembly 128, and a jib 152 of the fall protection system 100 can be pivoted relative to the base plate 104, as per requirements. As such, the base assembly 116 is pivotable about pivot points 118 (shown in FIG. 3). Further, the base assembly 116 is coupled proximate to the first side 106 of the base plate 104 using a number of mechanical fasteners 120 (shown in FIG. 3). More particularly, a plate 122 (shown in FIG. 3) of the base assembly 116 is removably coupled to the base plate 104. The mechanical fasteners 120 may include bolts, screws, and the like. The mechanical fasteners 120 may be removed in order to facilitate pivoting of the base assembly 116 during tip-up installations or transportation. Further, a counterweight 126 is connected to the base plate 104.

The fall protection system 100 includes the mast assembly 128 connected to the base plate 104 disposed proximate to the first side 106 of the base plate 104. More particularly, the mast assembly 128 is connected to the base plate 104 by the base assembly 116. The mast assembly 128 is rotatable about a first axis "A1" defined by the mast assembly 128. The mast assembly 128 includes a fixed mast section 130 and a movable mast section 132. The movable mast section 132 is adapted to move relative to the fixed mast section 130 for adjusting a height "H1" of the mast assembly 128. Accordingly, the movable mast section 132 may be moved relative to the fixed mast section 130 so that the height "H1" of the mast assembly 128 may be varied, as per application requirements. The movable mast section 132 may move along a first direction "D1" to increase the height "H1" of the mast assembly 128 and move in a direction that is opposite to the first direction "D1" to decrease the height "H1" of the mast assembly 128. In other words, the movable mast section 132 is extendable and retractable with respect to the base plate 104. Further, in a stowed position of the fall protection system 100, the movable mast section 132 may be in a fully retracted position. When the fall protection system

100 is in use, the movable mast section 132 may extend with respect to the base plate 104 based on relative movement between the movable mast section 132 and the fixed mast section 130. The fixed and movable mast sections 130, 132 may include hollow square-shaped tubes, without any limitations.

Figure 3:
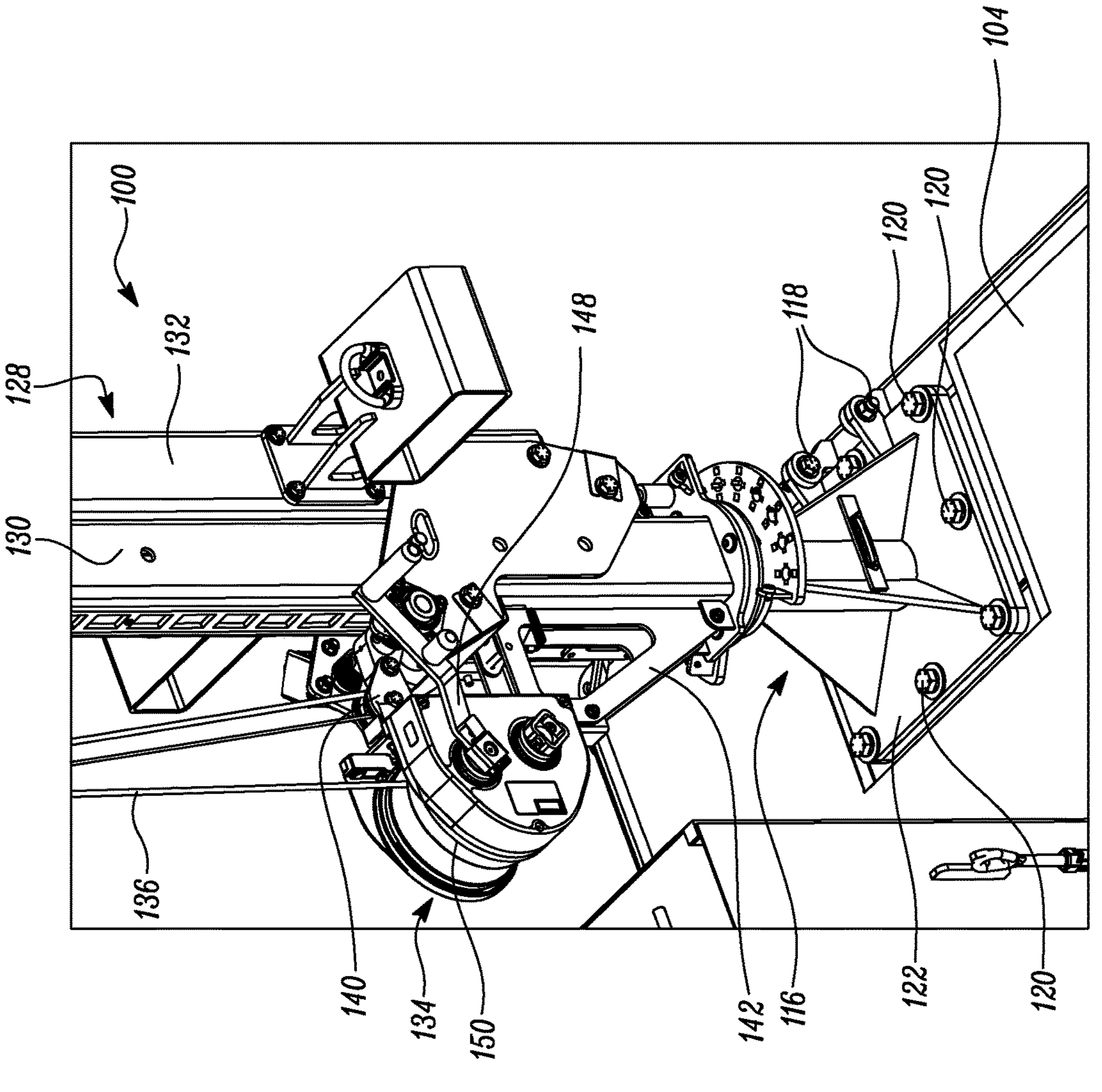
FIG. 3 is a perspective view illustrating a primary mechanism associated with the fall protection system shown in FIG. 1.

Referring to FIG. 3, a primary mechanism 134 is associated with the fall protection system 100. In an example, the primary mechanism 134 is embodied as a winch assembly. The primary mechanism 134 may be hereinafter interchangeably referred to as the winch assembly 134. The winch assembly 134 is operably connected to the movable mast section 132. More particularly, the winch assembly 134 is operably connected to the movable mast section 132 to move the movable mast section 132 relative to the fixed mast section 130. Further, the winch assembly 134 is connected to the fixed mast section 130 via a bracket 142. The movable mast section 132 is movable based on an operation of the winch assembly 134. The winch assembly 134 includes a cable 136. The winch assembly 134 is adapted to at least one of move the movable mast section 132 relative to the fixed mast section 130 and lock the movable mast section 132 relative to the fixed mast section 130. The winch assembly 134 selectively applies a first tension "T1" on the movable mast section 132 to move the movable mast section 132 relative to the fixed mast section 130 in order to raise the height "H1" of the mast assembly 130. Moreover, the winch assembly 134 selectively applies a second tension "T2" on the movable mast section 132 when the movable mast section 132 is locked with the fixed mast section 130 to prevent relative movement between the fixed mast section 130 and the movable mast section 132. The second tension "T2" is hereinafter interchangeably referred to as the tension "T2".

Further, the winch assembly 134 includes the cable 136 that selectively applies the tension "T2" by the winch assembly 134. More particularly, the cable 136 is adapted to selectively apply the tension "T2" on the movable mast section 132 to prevent relative movement between the fixed mast section 130 and the movable mast section 132. Further, the cable 136 is adapted to selectively allow relative movement between the fixed mast section 130 and the movable mast section 132. More particularly, the cable 136 selectively applies the first tension "T1" to move the movable mast section 132 relative to the fixed mast section 130. The winch assembly 134 includes a first pulley (not shown) coupled with the fixed mast section 130 by a bracket 138, a second pulley 140, and a winch drum 150. The cable 136 is routed through the first pulley and the second pulley 140 such that one end of the cable 136 is terminated at an upper end 146 of the fixed mast section 130. The winch assembly 134 may be operated manually or using a power drill (not shown).

Further, the winch assembly 134 includes a handle 148. When the winch assembly 134 is manually operated, a personnel rotates the handle 148 which in turn rotates the winch drum 150 through a series of gears (not shown). The rotation of the winch drum 150 causes the cable 136 to retract or wind around the winch drum 150. The retraction of the cable 136 around the winch drum 150 causes the movable mast section 132 to move along the first direction "Dl" (shown in FIG. 2) thereby raising the height "H1" of the mast assembly 128. Further, the winch assembly 134 applies the tension "T2" on the movable mast section 132 to retain the movable mast section 132 in a stationary position. More particularly, the winch assembly 134 locks the movable mast section 132 with the fixed mast section 130 in order to eliminate any relative movement between the fixed mast section 130 and the movable mast section 132. In an example, the winch assembly 134 may include a brake mechanism (not shown) that restricts any further winding of the cable 136 around the winch drum 150 thereby restricting any relative movement between the movable mast section 132 and the fixed mast section 130. It should be noted that the movable mast section 132 is held in the stationary position based on the second tension "T2" applied by the winch assembly 134. Further, an unwinding of the cable 136 causes the movable mast section 132 to move in the direction that is opposite to the first direction "D1" thereby reducing the height "H1" of the mast assembly 128.

When the winch assembly 134 is operated by the power drill, the handle 148 is replaced by a clutch adapter. The clutch adapter is coupled to a powered drive hub of the winch assembly 134. The power drill is then attached to an input shaft of the clutch adapter. When the power drill is activated, the input shaft is rotated which rotates the winch drum 150 through the series of gears and the cable 136 is retracted around the winch drum 150 thereby raising the height "H1" of the mast assembly 128.

As shown in FIG. 2, the fall protection system 100 also includes a jib 152 inclined with respect to the mast assembly 128 and pivotably connected to the mast assembly 128. More particularly, the jib 152 is pivotably connected to the movable mast section 132. In the illustrated embodiment, the jib 152 is substantially perpendicular to the movable mast section 132. The jib 152 defines a first end 158 and a second end 159. A first bracket member 154 is fixedly connected at an upper portion 156 of the movable mast section 132. The first end 158 of the jib 152 is connected to the first bracket member 154 such that the jib 152 is pivotably connected at a pivot point 160. The first bracket member 154 may include bearings and a shaft that facilitates pivoting of the jib 152 relative to the movable mast section 132. In some examples, the jib 152 may include one or more telescopic arms, without any limitations. Further, when the fall protection system 100 is assembled, the jib 152 is held perpendicular to the mast assembly 128 by a bar 162. A first end 164 of the bar 162 is pivotably connected to the movable mast section 132 by a second bracket member 166. A second end 168 of the bar 162 is connected to the jib 152 by a third bracket member 170.

In an example, the jib 152 includes an anchor point 172. As illustrated in FIG. 2, the anchor point 172 is connected to the second end 159 of the jib 152. The anchor point 172 provides a point at which one end of a securing device, such as a cable, a harness, or any other such device may be secured to the fall protection system 100. Another end of the securing device is secured to the personnel to provide fall protection to the personnel. In other examples, a location of the anchor point 172 may vary, as per requirements. For example, the jib 152 may include a track (not shown) secured to an underside of the jib 152. A trolley (not shown) may be slidably or rollably connected to the track such that the anchor point 172 is connected to the trolley in order to vary the location of the anchor point 172.

Figure 4:
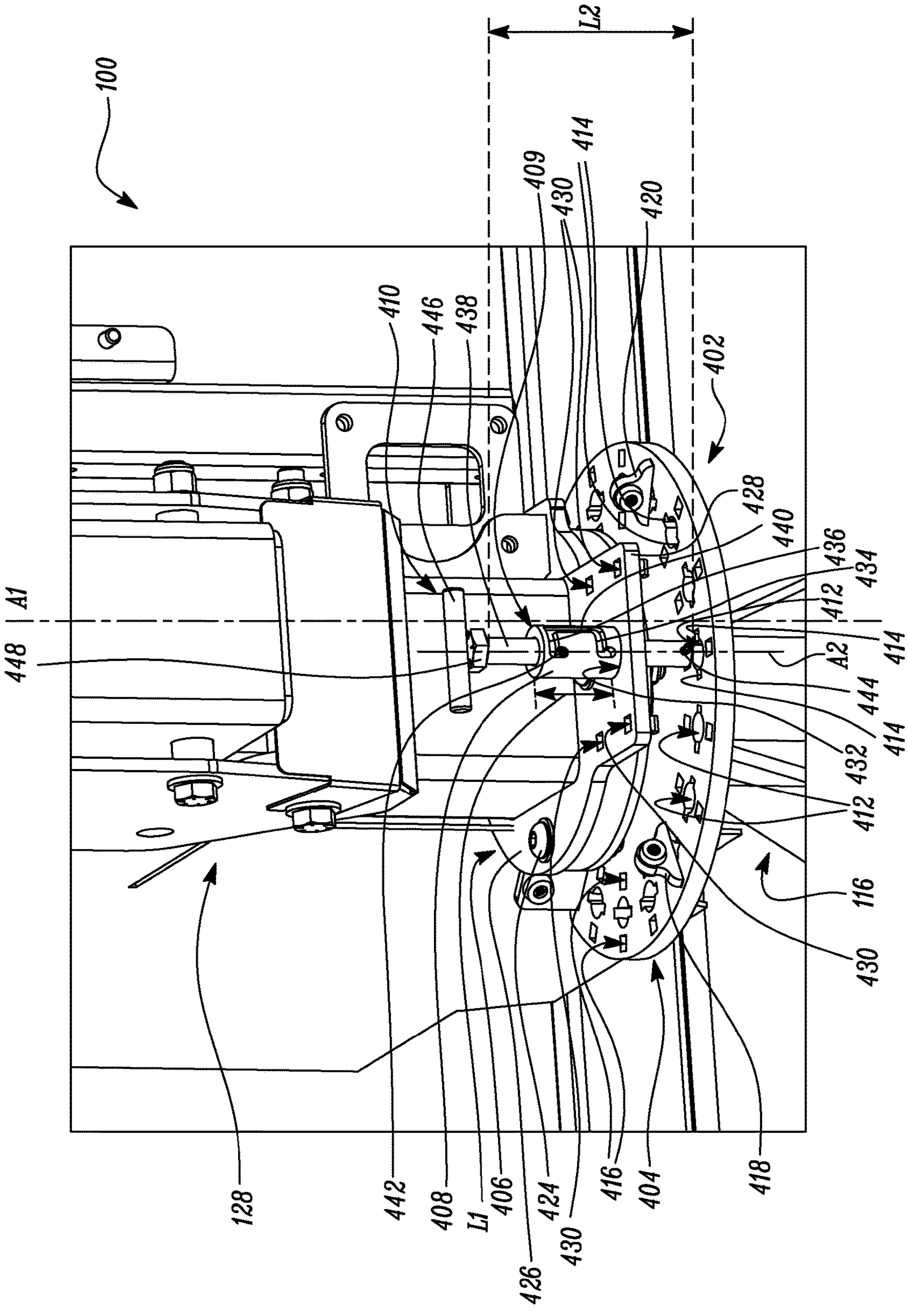
FIG. 4 is a perspective view illustrating a locking assembly associated with the fall protection system shown in FIG. 1, wherein a locking pin of the locking assembly is shown in a disengaged position.

As shown in FIG. 4, the fall protection system 100 includes a locking assembly 402 adapted to lock the mast assembly 128 with the base assembly 116. More particularly, the locking assembly 402 locks the mast assembly 128 with the base assembly 116 to restrict an angular movement of the mast assembly 128 relative to the base assembly 116 as well as a longitudinal movement of the mast assembly 128 relative to the mast assembly 128 along the first axis "A1". The locking assembly 402 includes a first plate 404, a second plate 406, a fixed member 408, and a locking pin 410 movable between an engaged position and a disengaged position. Various components of the locking assembly 402 will now be explained in detail.

The locking assembly 402 includes the first plate 404 fixedly coupled to the base assembly 116. The first plate 404 is substantially circular in shape. The first plate 404 defines a plurality of through-holes 412. Further, the first plate 404 defines a plurality of slots 414, such that each through-hole 412 of the plurality of through-holes 412 is in communication with a corresponding slot 414. More particularly, each through-hole 142 is in communication with two slots 414. The through-holes 412 are equidistantly defined in the first plate 404 and are embodied as circular through-holes. Alternatively, the through-holes 412 may be square in shape.

Further, the first plate 404 defines a plurality of pairs of cut-outs 416, such that a pair of bracket members 418, 420 are removably coupled with two corresponding pairs of cut-outs 416 of the plurality of pairs of cut-outs 416 for restricting the angular movement of the mast assembly 128 relative to the base assembly 116. The pairs of cut-outs 416 may be hereinafter interchangeably referred to as the first pairs of cut-outs 416. The first pairs of cut-outs 416 are square in shape. Alternatively, the first pairs of cut-outs 416 may be rectangular in shape. A total number of the first pairs of cut-outs 416 corresponds to a total number of the first through-holes 412.

Further, the locking assembly 402 includes the first bracket member 418 and the second bracket member 420. The first and second bracket members 418, 420 are coupled with two distinct and angularly spaced first pairs of cut-outs 416 to restrict the angular movement of the mast assembly 128. The angular spacing between the two first pairs of cut-outs 416 may correspond to an angular range of rotation of the mast assembly 128. It should be noted that the first and second bracket members 418, 420 may be coupled to any two first pairs of cut-outs 416 based on application requirements. As illustrated, the first and second bracket members 418, 420 are connected with two first pairs of cut-outs 416 such that five through-holes 412 are defined between the two first pairs of cut-outs 416 that receive the first and second bracket members 418, 420, respectively. Alternatively, a number of the through-holes 412 defined between the two first pairs of cut-outs 416 that receive the first and second bracket members 418, 420 may vary as per requirements.

In an example, the first and second bracket members 418, 420 may be removably coupled to the corresponding first pairs of cut-outs 416 by mechanical engagement. More particularly, the first and second bracket members 418, 420 may define a pair of projections that are aligned and received within the corresponding first pairs of cut-outs 416 for coupling of the first and second bracket members 418, 420. However, it may be contemplated that the first and second bracket members 418, 420 are coupled with the first plate 402 using mechanical fasteners, such as, bolts, screws, and the like. In some cases, the first and second bracket members 418, 420 may be coupled to any two first pairs of cut-outs 416 when the locking pin 410 is in the disengaged position and the mast assembly 128 is movable relative to the base assembly 116. The first and second bracket members 418, 420 may then restrict the angular movement of the mast assembly 128.

The locking assembly 402 also includes the second plate 406 fixedly coupled to the mast assembly 128. The second plate 406 is connected to the mast assembly 128 by mechanical fasteners 424, such as bolts, screws, and the like. The second plate 406 includes a first portion 426 and a second portion 428 integral with the first portion 426. The first portion 426 is substantially circular in shape. Further, the second portion 428 is substantially rectangular in shape. The second portion 428 defines two second pairs of cut-outs 430 and a through-opening 432. The two second pairs of cut-outs 430 are provided at opposing sides of the through-opening 432. The first and second bracket members 418, 420 are removably coupled with the respective second pairs of cut-outs 430. In some examples, the first and second bracket members 418, 420 may be coupled to the corresponding second pairs of cut-outs 430 when the mast assembly 128 is locked with the base assembly 116, i.e. when the locking pin 410 is in the engaged position. The first and second bracket members 418, 420 may be removably coupled to the second pairs of cut-outs 430 by mechanical engagement. More particularly, the projections of the first and second bracket members 418, 420 may be aligned and received within the corresponding second pairs of cut-outs 430 to couple the first and second bracket members 418, 420 with the second plate 406.

The locking assembly 402 includes the fixed member 408 fixedly coupled to the second plate 406. The fixed member 408 defining a first groove 434 and a second groove 436. The first groove 434 is spaced apart from the second groove 436 with respect to a longitudinal axis "A2". The fixed member 408 defines the longitudinal axis "A2" along its length "L1". Further, the locking pin 410 is movable along the longitudinal axis "A2" and rotatable about the longitudinal axis "A2" relative to the fixed member 408. The fixed member 408 further includes a third groove 440 extending from and communicating with the first groove 434 and the second groove 436. In the illustrated embodiments, the first, second, and third grooves 434, 436,440 form a continuous through opening in the fixed member 408. Each of the first and second grooves 434, 436 is disposed in a substantially L-shaped configuration with respect to the third groove 440. Further, the third groove 440 extends substantially along the longitudinal axis "A2". The locking pin 410 is rotatable from the disengaged position such that a first tab 442 is at least partially received within the third groove 440. As illustrated, the first, third, and second grooves 434, 440, 436 define a substantially C-shaped path along which the first tab 442 may move when the locking pin 410 needs to be switched between the engaged and disengaged positions.

The fixed member 408 has a substantially hollow tubular shape. The fixed member 408 includes a circular cross-section. Alternatively, the fixed member 408 may include a square cross-section. The fixed member 408 may include a free end 409 that is spaced apart from the second plate 406. In an alternative example, the second groove 436 is disposed at the free end 409. Further, in such an example, the third groove 440 may extend from the free end 409 and may only communicate with the first groove 434.

The locking assembly 402 includes the locking pin 410 including an elongate portion 438 at least partially received within the fixed member 408 and the first tab 442 extending from the elongate portion 438. The locking pin 410 is movable relative to the fixed member 408 between the engaged position and the disengaged position. More particularly, the first plate 404 includes the plurality of through-holes 412, wherein, in the engaged position, the elongate portion 438 is received through a corresponding through-hole 412 of the plurality of through-holes 412. The corresponding through-hole 412 is the through-hole 412 that is angularly aligned with the elongate portion 438 of the locking pin 410. The locking pin 410 is shown in the disengaged position in FIGS. 4 and 5. Whereas, the locking pin 410 is shown in the engaged position in FIG. 6.

As shown in FIG. 4, the elongate portion 438 has a circular cross-section based on the cross-section of the fixed member 408. Accordingly, when the fixed member 408 includes a square cross-section, the elongate portion 438 may include a square cross-section. In such an example, the through-holes 412 may include square shaped through-holes to receive the elongate portion 438 therethrough. Further, the elongate portion 438 is aligned with and received within the through-opening 432 of the second portion 428. A diameter of the through-opening 432, a diameter defined by the fixed member 408, and a diameter of the through-holes 412 are based on a diameter of the elongate portion 438 so that the elongate portion 438 can be received by each of the through-opening 432, the fixed member 408, and the through-holes 412. Moreover, the length "L1" of the elongate portion 438 is greater than a length "L2" of the fixed member 408.

Further, the first tab 442 extends substantially perpendicular to the longitudinal axis "A2". In the engaged position, the first tab 442 is at least partially received within the first groove 434 such that the locking pin 410 is engaged with the first plate 404 to restrict the movement of the mast assembly 128 relative to the base assembly 116. More particularly, in the engaged position, the first tab 442 is at least partially received within the first groove 434, the elongate portion 438 of the locking pin 410 is received through the corresponding through-hole 412 of the plurality of through-holes 412 such that the locking pin 410 is engaged with the first plate 404, and at least one second tab 444 is misaligned with the slot 414 in communication with the corresponding through-hole 412 that receives the elongate portion 438 of the locking pin 410 therethrough. In the disengaged position, the first tab 442 is at least partially received within the second groove 436 such that the locking pin 410 is spaced apart from the first plate 404. It should be noted that dimensions of the first, second, and third grooves 434, 436, 440 are decided such that the first tab 442 can be received therein.

The locking pin 410 further includes the at least one second tab 444 spaced apart from the first tab 442. Further, in the engaged position of the locking pin 410, the at least one second tab 444 is misaligned with the slot 414 in communication with the corresponding through-hole 412 that receives the elongate portion 438 of the locking pin 410 therethrough. In the illustrated embodiment, the locking pin 410 includes a pair of second tabs 444 (only one shown). The pair of second tabs 444 are disposed diametrically opposite to each other and extend from a lower end of the elongate portion 438. Dimensions of the slots 414 are based on dimensions of the second tabs 444, so that the second tabs 444 can be received by the slots 414. When the first tab 442 is received in the third groove 440, the pair of second tabs 444 align with the corresponding pairs of slots 414. Further, when a handling portion 446 is rotated so that the first tab 442 is received within the first groove 434, the pair of second tabs 444 misalign with the corresponding slots 414. Moreover, when the first tab 442 is received within the second groove 436, the pair of second tabs 444 misalign with the corresponding slots 414.

The locking pin 410 further includes the handling portion 446 extending substantially perpendicular to the longitudinal axis "A2". The handling portion 446 is provided such that the handling portion 446 and the elongate portion 438 define a substantially T-shaped structure. The handling portion 446 provides a gripping surface for a personnel when the locking pin 410 needs to be moved between the engaged and disengaged positions. The locking pin 410 further includes a stop 448 that engages with the fixed member 408 in the engaged position of the locking pin 410. The stop 448 is disposed between the handling portion 446 and the elongate portion 438. The stop 448 is hexagonal in shape. However, a shape of the stop 448 may vary, without any limitations. The stop 448 can engage with the free end 409 of the fixed member 408 to restrict further downward travel of the elongate portion 438 along the longitudinal axis "A2".

Figure 5:
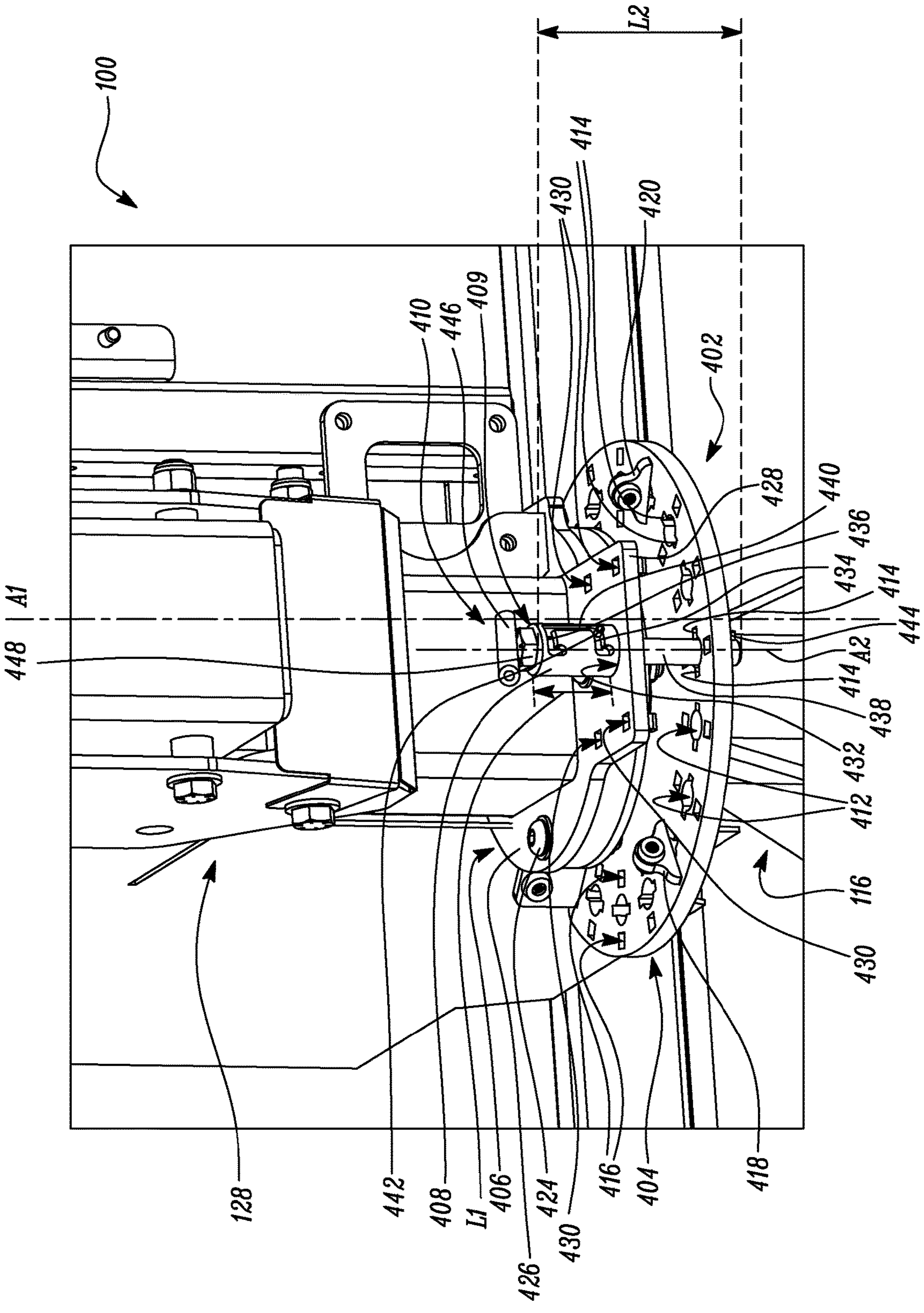
FIG. 5 is a perspective view illustrating the locking pin of FIG. 4 positioned in a groove.

As shown in FIG. 5, when the mast assembly 128 needs to be locked with the base assembly 116, the locking pin 410 needs to be moved to the engaged position. In order to move the locking pin 410 to the engaged position, the handling portion 446 is rotated such that the first tab 442 is received within the third groove 440. Further, as the first tab 442 is received within the third groove 440, the second tabs 444 align with the corresponding slots 414 and the elongate portion 438 is received within the corresponding through-hole 412.

Figure 6:
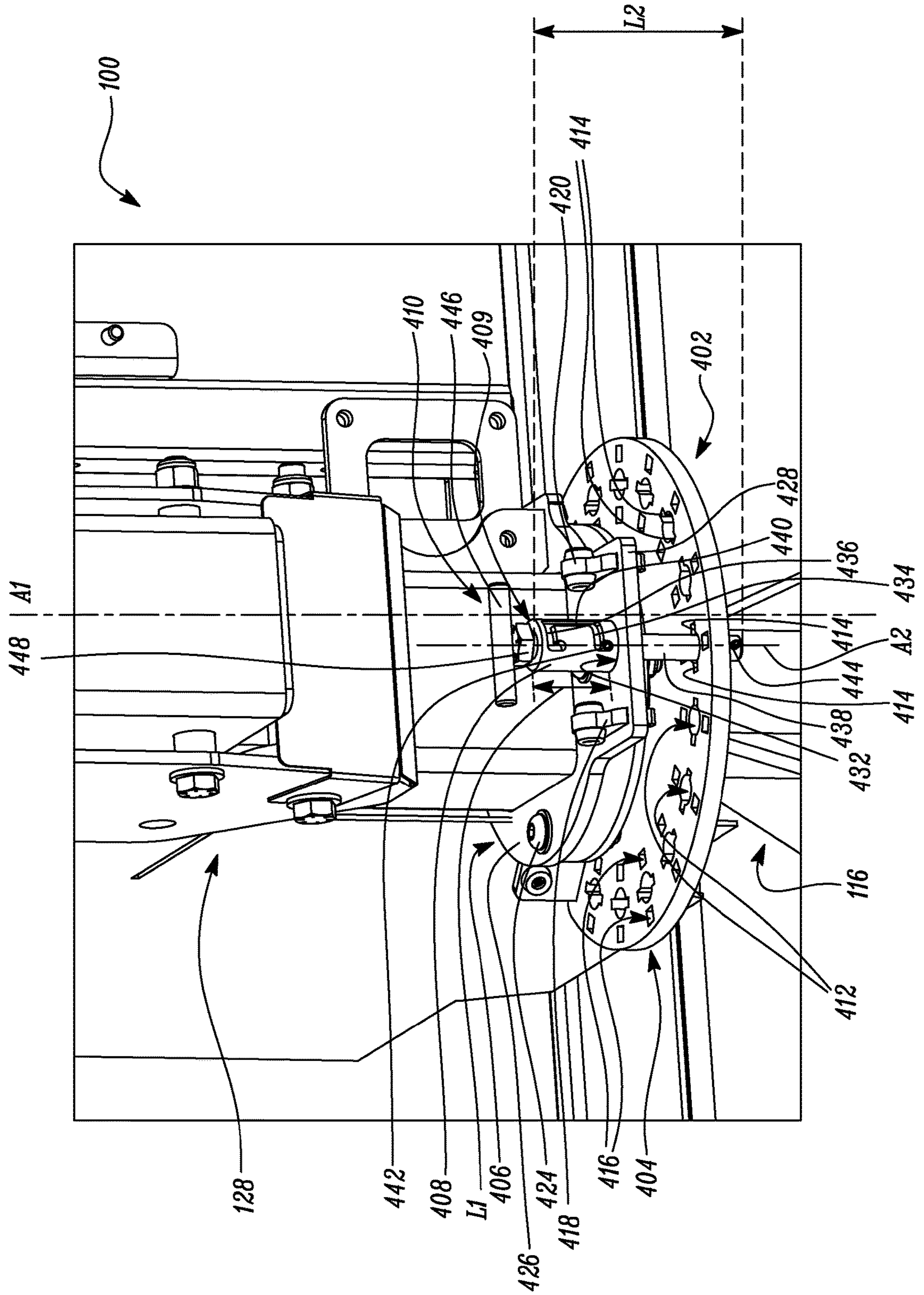
FIG. 6 is a perspective view illustrating the locking pin of FIG. 4 in an engaged position.

Referring now to FIG. 6, in order to lock the mast assembly 128 with the base assembly 116, the handling portion 446 is operated to rotate the locking pin 410 so that the first tab 442 is received within the first groove 434. When the first tab 442 is received within the first groove 434, the second tabs 444 misalign with the corresponding slots 414 thereby engaging the locking pin 410 with the first plate 404. As the locking pin 410 engages with the first plate 404, any possibility of movement of the locking pin 410 along the longitudinal axis "A2" may be eliminated. It should be noted that the first and second tabs 442, 444 provide a dual locking feature that may eliminate possibility of undesired movement of the mast assembly 128 relative to the base assembly 116. Further, as the locking pin 410 is captive with the fixed member 408, any possibility of misplacement of the locking pin 410 is eliminated.

When an orientation of the mast assembly 128 needs to be adjusted, the locking pin 410 is moved to the disengaged position. As a first step, the locking pin 410 is rotated such that the first tab 442 is received in the third groove 440. When the first tab 442 is received in the third groove 440, the second tabs 444 align with the slots 444. Further, the handling portion 446 is operated to remove the elongate portion 438 from the through-hole 142 so that the first tab 442 is received in the second groove 436. When the first tab 442 is received in the second groove 436, the elongate portion 438 is disengaged form the first plate 404. Accordingly, the mast assembly 128 can be oriented as desired.

Figure 7:
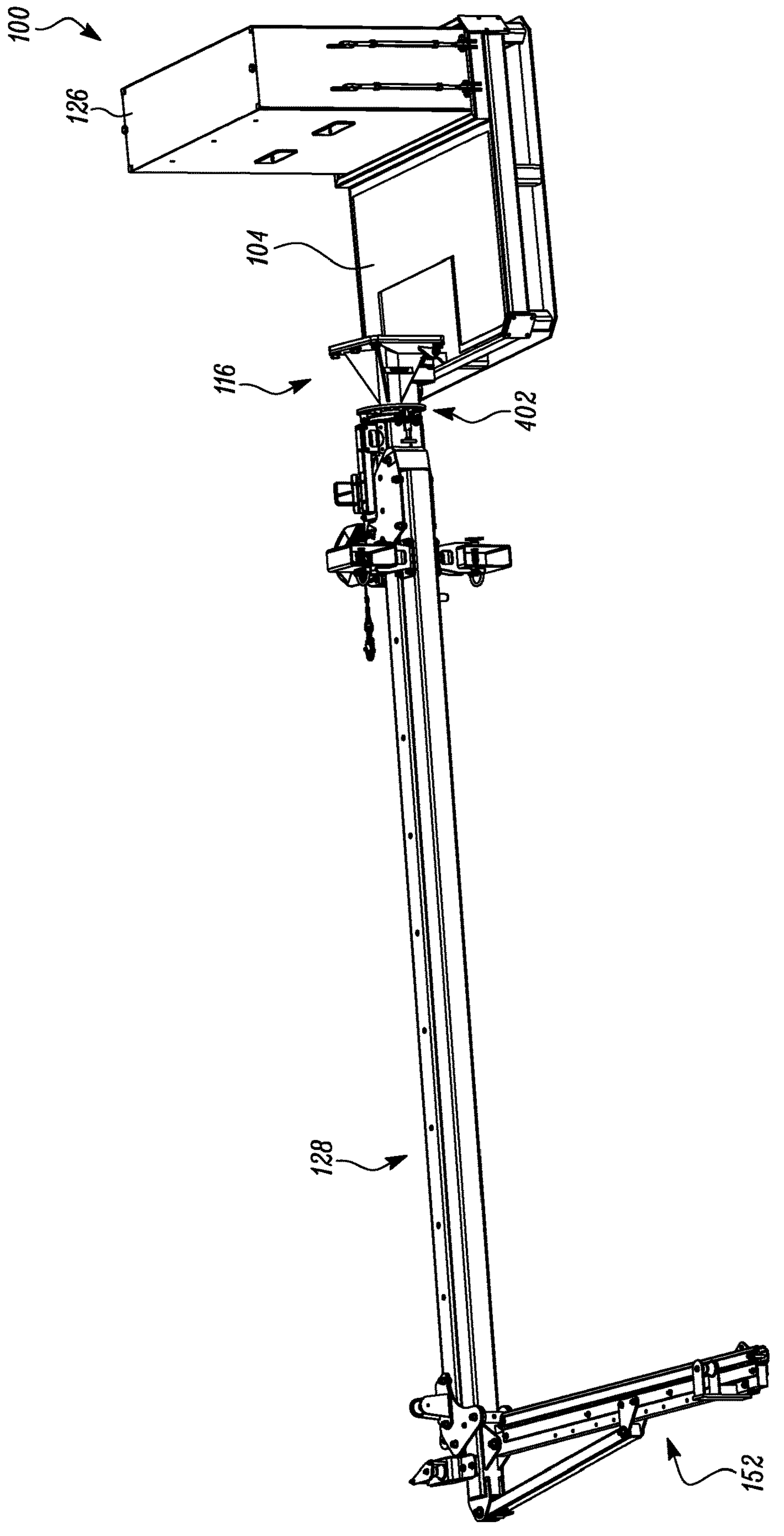
FIG. 7 illustrates the fall protection system shown in FIG. 1 during a tip-up installation process.

As shown in FIG. 7, the base assembly 116 and the mast assembly 128 along with the jib 152 is illustrated in a pivoted condition relative to the base plate 104. As illustrated, the locking assembly 402 allows locking of the mast assembly 128 to the base assembly 116 so that the base assembly 116 and the mast assembly 128 may pivot during tip-up installations, or during transportation/storage, as per requirements. Thus, fastening of the mast assembly 128 with the base assembly 116 may prevent the mast assembly 128 from being removed from the base assembly 116 during tip-up installations. The ability of the locking assembly 402 to secure the mast assembly 128 to the base assembly 116 during tip-up installations may enable customers to maximize the height "H1" (see FIG. 2) of the mast assembly 128 by tipping up the mast assembly 128 to a maximum height allowed by overhead restrictions, such as, ceilings, cranes, support structure, and the like. Further, the locking assembly 402 may allow the mast assembly 128 to be locked in position while the fall protection system 100 is being transported thereby preventing damage or injury. The locking assembly 402 may also improve operational reliability of the fall protection system 100 by ensuring that the mast assembly 128 is held stationary.

Moreover, the locking assembly 402 may provide a rotation locking feature in order to prevent the rotation of the mast assembly 128 about the first axis "A1", relative to the base assembly 116. Additionally, the locking assembly 402 may provide a rotation angle limit feature that may prevent the angular movement of the mast assembly 128 beyond a desired working angle range. Further, the working angle range may be easily varied based on changing the coupling locations of the first and second bracket members 418, 420 as per application requirements. It should be noted that the feature of limiting the angular movement of the mast assembly 128 may eliminate damage to any existing structures that may interfere with the fall protection system 100 if the fall protection system 100 may be allowed to fully rotate.

Figure 8:
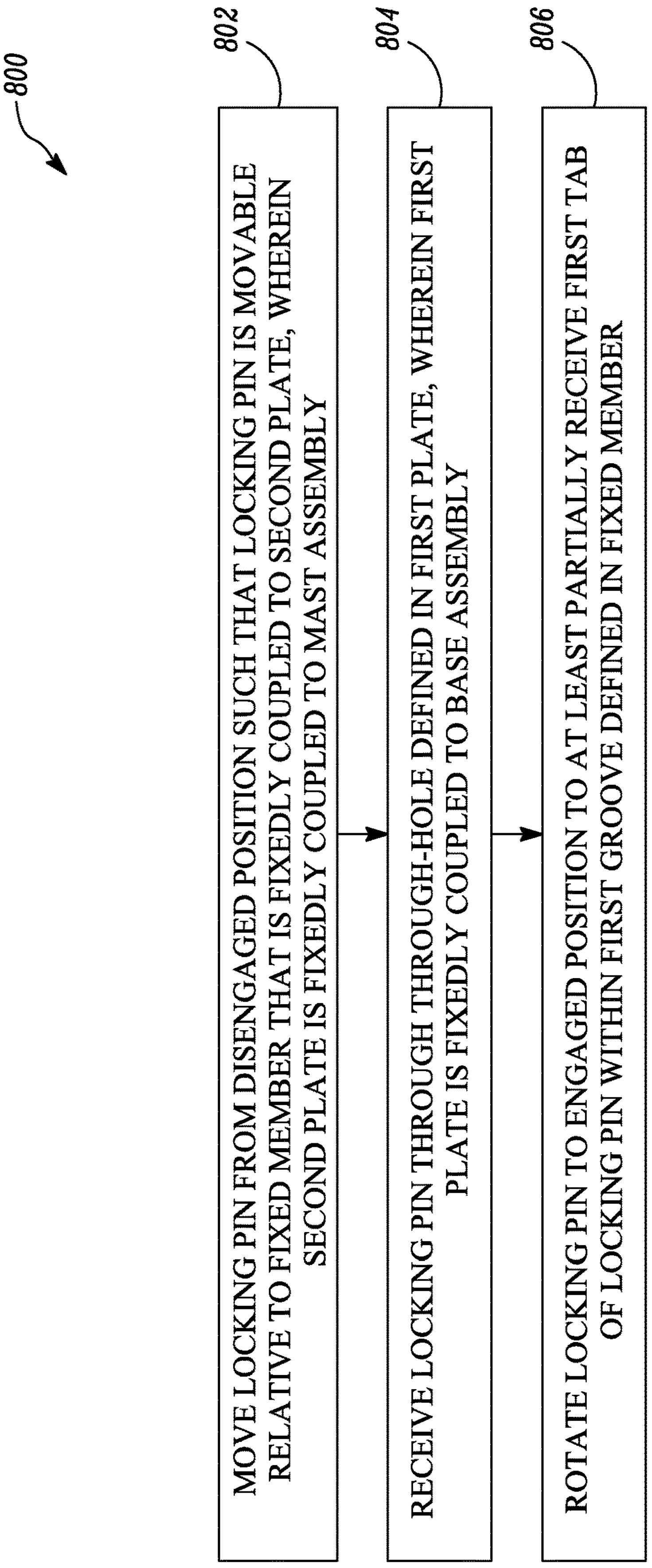
FIG. 8 is a flowchart for a method of locking a mast assembly with a base assembly of a fall protection system.

FIG. 8 illustrates a flowchart for a method 800 of locking the mast assembly 128 with the base assembly 116 of the fall protection system 100. At step 802, the locking pin 410 is moved from the disengaged position such that the locking pin 410 is movable relative to the fixed member 408 that is fixedly coupled to the second plate 406. The second plate 406 is fixedly coupled to the mast assembly 128. Moreover, the step of moving the locking pin 410 from the disengaged position further includes at least partially receiving the first tab 442 of the locking pin 410 within the third groove 440 extending from and communicating with the first groove 434 and the second groove 436. At step 804, the locking pin 410 is received through the through-hole 412 defined in the first plate 404, wherein the first plate 404 is fixedly coupled to the base assembly 116.

At step 806, the locking pin 410 is rotated to the engaged position to at least partially receive the first tab 442 of the locking pin 410 within the first groove 434 defined in the fixed member 408. Further, the at least one second tab 444 of the locking is moved through the slot 414 defined in the first plate 404, wherein the slot 414 is in communication with the through-hole 412 that receives the locking pin 410 therethrough. Moreover, the step of rotating the locking pin 410 to the engaged position further includes the step of misaligning the at least one second tab 444 of the locking pin 410 with the slot 414. Additionally, the pair of bracket members 418, 420 are removably coupled with two corresponding pairs of cut-outs 416 defined in the first plate 404 for restricting the angular movement of the mast assembly 128 relative to the base assembly 116.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A fall protection system comprising:
- a base assembly;
- a mast assembly rotatable about a first axis defined by the mast assembly; and
- a locking assembly adapted to lock the mast assembly with the base assembly, wherein the locking assembly includes:
  - a first plate fixedly coupled to the base assembly;
  - a second plate fixedly coupled to the mast assembly;

- a fixed member fixedly coupled to the second plate, the fixed member defining a first groove and a second groove; and
  - a locking pin including an elongate portion at least partially received within the fixed member and a first tab extending from the elongate portion, the locking pin being movable relative to the fixed member between an engaged position and a disengaged position,
  - wherein, in the engaged position, the first tab is at least partially received within the first groove such that the locking pin is engaged with the first plate to restrict a movement of the mast assembly relative to the base assembly, and
  - wherein, in the disengaged position, the first tab is at least partially received within the second groove such that the locking pin is spaced apart from the first plate.

2. The fall protection system of claim 1, wherein the fixed member defines a longitudinal axis along its length, wherein the locking pin is movable along the longitudinal axis and rotatable about the longitudinal axis relative to the fixed member.

3. The fall protection system of claim 2, wherein the first tab extends substantially perpendicular to the longitudinal axis.

4. The fall protection system of claim 2, wherein the first groove is spaced apart from the second groove with respect to the longitudinal axis.

5. The fall protection system of claim 2, wherein the locking pin further includes a handling portion extending substantially perpendicular to the longitudinal axis.

6. The fall protection system of claim 1, wherein the fixed member further includes a third groove extending from and communicating with the first groove and the second groove, and wherein the locking pin is rotatable from the disengaged position such that the first tab is at least partially received within the third groove.

7. The fall protection system of claim 1, wherein the fixed member has a substantially hollow tubular shape.

8. The fall protection system of claim 1, wherein the first plate includes a plurality of through-holes, wherein, in the engaged position, the elongate portion is received through a corresponding through-hole of the plurality of through-holes.

9. The fall protection system of claim 8, wherein the first plate defines a plurality of slots, such that each through-hole of the plurality of through-holes is in communication with a corresponding slot.

10. The fall protection system of claim 9, wherein the locking pin further includes at least one second tab spaced apart from the first tab, and wherein, in the engaged position of the locking pin, the at least one second tab is misaligned with the slot in communication with the corresponding through-hole that receives the elongate portion of the locking pin therethrough.

11. The fall protection system of claim 1, wherein the first plate defines a plurality of pairs of cut-outs, such that a pair of bracket members are removably coupled with two corresponding pairs of cut-outs of the plurality of pairs of cut-outs for restricting an angular movement of the mast assembly relative to the base assembly.

12. A fall protection system comprising:
- a base assembly;
- a mast assembly rotatable about a first axis defined by the mast assembly; and a locking assembly adapted to lock the mast assembly with the base assembly, wherein the locking assembly includes:

a first plate fixedly coupled to the base assembly, wherein the first plate defines a plurality of through-holes and a plurality of slots, such that each through-hole of the plurality of through-holes is in communication with a corresponding slot;

a second plate fixedly coupled to the mast assembly;

a fixed member fixedly coupled to the second plate, the fixed member defining a first groove and a second groove; and a locking pin including an elongate portion at least partially received within the fixed member, a first tab extending from the elongate portion, and at least one second tab spaced apart from the first tab, the locking pin being movable relative to the fixed member between an engaged position and a disengaged position, wherein, in the engaged position, the first tab is at least partially received within the first groove, the elongate portion of the locking pin is received through a corresponding through-hole of the plurality of through-holes such that the locking pin is engaged with the first plate, and the at least one second tab is misaligned with the slot in communication with the corresponding through-hole that receives the elongate portion of the locking pin therethrough, and wherein, in the disengaged position, the first tab is at least partially received within the second groove such that the locking pin is spaced apart from the first plate.

13. The fall protection system of claim 12, wherein the fixed member defines a longitudinal axis along its length, wherein the locking pin is movable along the longitudinal axis and rotatable about the longitudinal axis relative to the fixed member.

14. The fall protection system of claim 12, wherein the fixed member further includes a third groove extending from and communicating with the first groove and the second groove, wherein the locking pin is rotatable from the disengaged position such that the first tab is at least partially received within the third groove.

15. The fall protection system of claim 12, wherein the first plate defines a plurality of pairs of cut-outs, such that a pair of bracket members are removably coupled with two corresponding pairs of cut-outs of the plurality of pairs of cut-outs for restricting an angular movement of the mast assembly relative to the base assembly.

16. A method of locking a mast assembly with a base assembly of a fall protection system, the method comprising:

moving a locking pin from a disengaged position such that the locking pin is movable relative to a fixed member that is fixedly coupled to a second plate, wherein the second plate is fixedly coupled to the mast assembly;

receiving the locking pin through a through-hole defined in a first plate, wherein the first plate is fixedly coupled to the base assembly; and rotating the locking pin to an engaged position to at least partially receive a first tab of the locking pin within a first groove defined in the fixed member.

17. The method of claim 16, wherein moving the locking pin from the disengaged position further includes at least partially receiving the first tab of the locking pin within a third groove extending from and communicating with the first groove and the second groove.

18. The method of claim 16, further comprising moving at least one second tab of the locking through a slot defined in the first plate, wherein the slot is in communication with the through-hole that receives the locking pin therethrough.

19. The method of claim 18, wherein rotating the locking pin to the engaged position further comprising misaligning the at least one second tab of the locking pin with the slot.

20. The method of claim 16 further comprising removably coupling a pair of bracket members with two corresponding pairs of cut-outs defined in the first plate for restricting an angular movement of the mast assembly relative to the base assembly.

* * * * *